United States Patent [19]
Ito et al.

[11] Patent Number: 4,673,974
[45] Date of Patent: Jun. 16, 1987

[54] IMAGE TRANSMISSION SYSTEM

[75] Inventors: Tetsuo Ito; Setsuo Arita; Wataru Kitaura, all of Hitachi, Japan

[73] Assignee: Hitachi, Ltd., Tokyo, Japan

[21] Appl. No.: 816,841

[22] Filed: Jan. 7, 1986

[30] Foreign Application Priority Data

Jan. 18, 1985 [JP] Japan .................... 60-5743

[51] Int. Cl.$^4$ ................ H04N 7/18; G08B 1/08
[52] U.S. Cl. .................... 358/108; 358/86; 340/531; 340/534
[58] Field of Search .......... 358/86, 108; 340/531, 340/534

[56] References Cited
U.S. PATENT DOCUMENTS 4,511,886  4/1985  Rodriguez .................. 358/108

Primary Examiner—James J. Groody
Assistant Examiner—Michael D. Parker
Attorney, Agent, or Firm—Antonelli, Terry & Wands

[57] ABSTRACT

Plural television cameras situated at monitored sites, each assigned with a particular code, generate image signals of the sites. An image signal transmitting unit receives those signals and transmits an image transmission signal over a transmission a monitoring site. The transmission signal is so formed that one channel of the transmission line which is divided into plural channels is assigned to the transmission of an image signal of high priority sites so as, to reproduce a full motion image of the remote site at the monitoring site and all the signals from the other sites are transmitted on a time-sharing basis through the remaining channels to reproduce frame repetition images. The assignment of the channels is determined by the order (priority) of codes included in an instruction signal from an instruction signal transmitting unit at the monitoring site. An operator can select the order (priority) of the codes.

4 Claims, 14 Drawing Figures

IMAGE TRANSMISSION SYSTEM

BACKGROUND OF THE INVENTION

1. Field of the Invention

The present invention relates to an image (an imagery data) transmission system and more particularly to an image transmission system incorporated into a monitoring system for a plant or a security system for a building, having a large number of sites to be monitored or observed so that the large amount of image data is transmitted between a monitor room and the sites being monitored or observed.

2. Description of the Related Art

Monitoring systems for various kinds of plants, security systems and the like employ an image transmission equipment. Typically, such image transmission equipment employs a plurality of television cameras situated at the sites to be monitored or observed. Image representation signal generated by a television camera are digitized by an encoder which employs both bandwidth compression and encoding the encoded signals are time-division multiplexed with digitized signals from other cameras for transmission over a transmission line.

In a monitoring room located at a control site remote from the siting equipped with the cameras, a demultiplexer demultiplexes the encoded image signals transmitted from the sites being monitored. The demultiplexed image signal is decoded by a decoder and an image is displayed on a corresponding monitor television set, so that an operator in the monitoring room can observe current conditions in the plural sites within a plant or building. In such an image transmission system, it is necessary to transmit image information from the cameras in real-time. In addition, it is preferable that malfunction of plant elements and unusual occurrences within a building observed via the television monitor.

Consider the case of a monitoring system where television cameras are provided at 50 sites of a plant to be monitored. If an image signal from each camera is converted into a digital signal encoded with 8 bits and this digital signal is transmitted at a base frequency of 4 MHz, the transmission rate required of the transmission line becomes as follows:

$$50 \times 4 \text{ MHz} \times 2 \times 8 \text{ bits} = 3.2 \text{ Gbps}$$

wherein the sampling rate for encoding the image signal depends on Shannon's sampling theorem.

At present, it is very difficult to realize a transmission line having such a bandwidth as calculated above. At least it can be said that it is almost impossible to realize such a transmission line commercially. On the other hand, the number 50 is not an unusually large number of sites to be monitored in a typical plant. Further, in a security system for a large building, the number of sites to be observed will typically be much larger.

SUMMARY OF THE INVENTION

An object of the present invention is to provide real time image transmission system which can effectively utilize the limited transmission capability of a transmission line connecting a site from which image information is transmitted and a site at which it is received.

A fundamental feature of the present invention the division of image data to be transmitted into data having a high degree of demand, i.e. important (high priority) image data, and other image data. A single transmission channel of the transmission line, which is divided into plural channels, is assigned for the transmission of each high priority image data, and other image data is transmitted on a time-sharing basis site the remaining channels of the transmission line.

More specifically, where the image transmission system according to the present invention is employed in the monitoring system of a plant or the security system of a building that includes a central monitoring site or station and a large number of remote sites to be monitored, each remote monitored site having a television camera the monitoring site being equipped with television monitors by way of which the remote sites can be monitored and a transmission line connecting therebetween, the frequency channels, an instruction signal is generated by an operator at the monitoring site, which includes an encoded signal in which a code assigned to each of the television cameras is arranged in an order selected by the operator. A first group of codes within the arrangement of codes is so designated that image signals generated by the cameras assigned the codes are transmitted as full motion image signals (imagery data), and a second group consisting of the remaining codes is so designated that image signals generated by the cameras assigned to the remaining codes are transmitted as frame repetition image signals (or imagery data). In accordance with this instruction signal, there is produced at the monitored site an image transmission signal which is so formed that, for the transmission of each of the image signals generated by the cameras assigned with the codes of the first group, one of the plural transmission channels is assigned and all of the image signals generated by the cameras assigned with the codes of the second group are multiplexed on the time-sharing basis and transmitted over the remaining transmission channels.

According to the present invention, images of high priority sites can be monitored on a real time basis by way of full motion images and images of the remaining sites may be monitored or watched using the frame repetition images. As a result the transmission capability of the transmission line can be considerably enhanced, compared with the case where the capability of the transmission line is equally shared for the transmission of image signals generated by all the cameras.

Further, when a malfunction or an abnormal condition occurs at a remote site which has been monitored by the frame repetition image an image of that site can be changed to a full motion image by reformatting the instruction signal such that the code of the camera at the site in question belongs to the first group of codes, so that the malfunction or abnormal condition occurring at the remote site can be monitored on real time basis.

DESCRIPTION OF THE PREFERRED EMBODIMENTS

Figure 1:
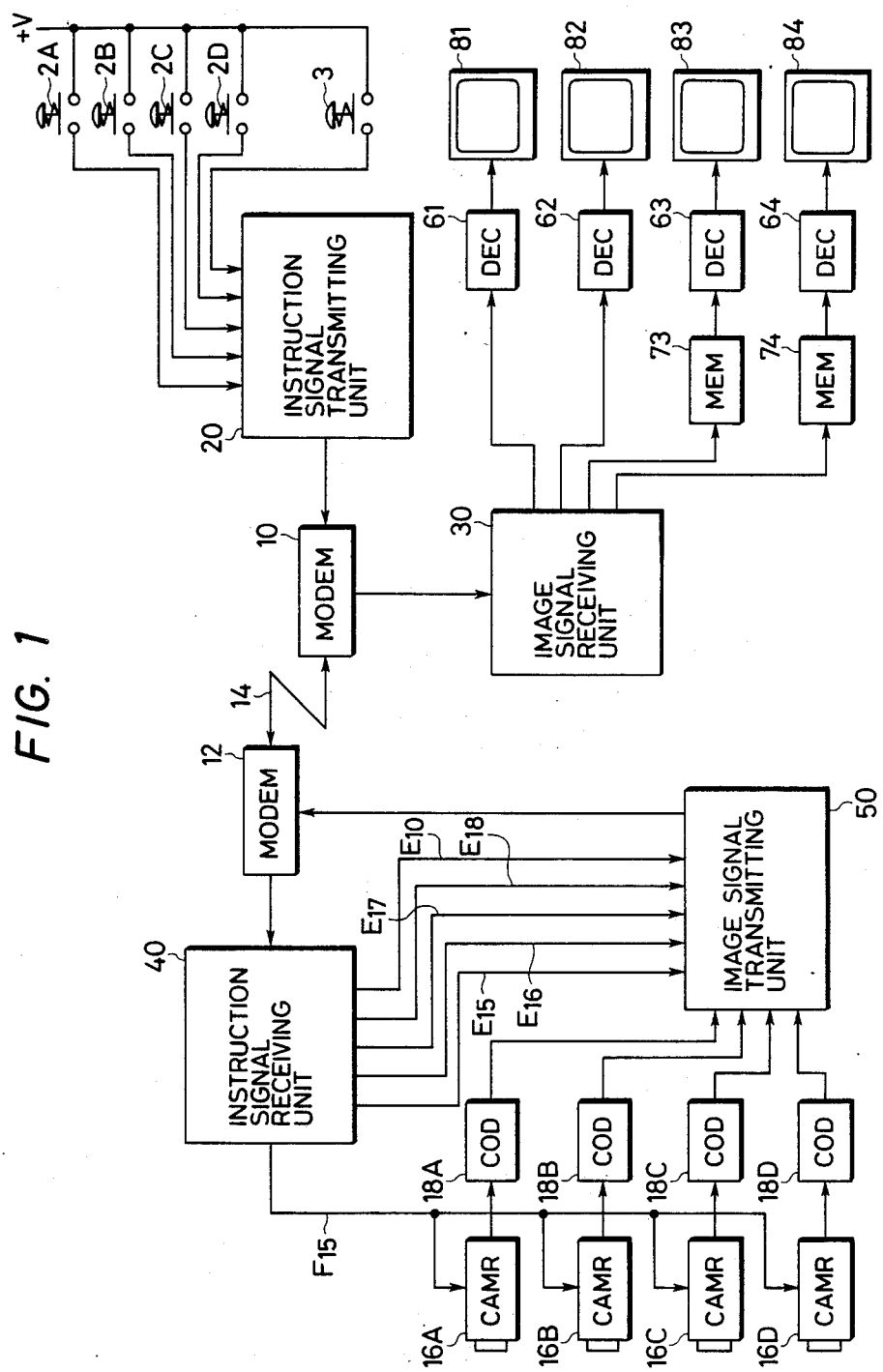
FIG. 1 shows the overall structure of an image transmission system according to an embodiment of the present invention, which is employed in a monitoring system in a plant or a security system for a building.

FIG. 1 is a schematic diagram showing the overall construction of an image transmission system according to an embodiment of the present invention. Referring at first to a right half of the figure, an arrangement of elements in a monitoring room is schematically illustrated as including an instruction signal transmitting unit 20 and an image signal receiving unit 30. To the instruction signal transmitting unit 20, signals which are produced by switches 2A, 2B, 2C, 2D and 3 are applied. These switches are provided on a monitoring board (not shown) installed in a monitoring (control) room and controlled by an operator. The switches 2A to 2D can be push-button switches, for example, and hence each switch produces an output signal only when the operator depresses it. Further, the operator may not control more than one of the switches 2A to 2D simultaneously, because, as will be apparent from the description to follow, a conflict occurs among signals produced by switches depressed simultaneously. In order to prevent this problem, there may be provided an electrical or mechanical locking mechanism which prevents a switch from being depressed when another switch is depressed. As the switch 3, a push-button switch, a knife switch or other types of switches can be used.

The image signal receiving unit 30 coupled receives image signals to decoders (abbreviated as DEC in the figure) 61, 62, 63 and 64. However, two decoders 61, 64 thereof receive the image signals through image memories (abbreviated as MEM in the figure) 73 and 74. Since the image signals are usually received by the image signal receiving unit 30 in a bandwidth-compressed format, the decoders 61 to 64 are necessary to decompress the image signals, in addition to the functions of decoding an encoded signal and connecting digital signals to analog signals. Such a decoder can be easily realized by a combination of known devices. Image memories 73 and 74 used here are of such a type that their contents can be periodically refreshed. Memories of this type are also well known.

The image signal which is decompressed, decoded and converted into an analog signal in each decoder 61 to 64, is coupled to a corresponding television monitor 81, 82, 83 and 84, on which the corresponding image is displayed.

The instruction signal transmitting unit 20 and the image signal receiving unit 30 are connected to a modem 10, to which unit 20 sends instruction signals and from which unit 30 receives image signals.

In the left half of FIG. 1, the arrangement of a remote site to be monitored is schematically shown as having an instruction signal receiving unit 40 and an image signal transmitting unit 50, both of which are connected to a modem 12. The modem 12 is connected to the modem 10 at the monitoring site through transmission line 14.

An instruction signal which is produced by instruction signal transmitting unit 20 and received by modem 12, is coupled to instruction signal receiving unit 40, which generates various types of timing and control signals in accordance with the received instruction signal. These signals generated by the unit 40 are coupled to the image signal transmitting unit 50. The timing signal among them is also coupled to television cameras (abbreviated as CAMR in the figure) 16A, 16B, 16C and 16D which are located at remote sites to be monitored in a plant or building. Each of cameras 16A to 16D detects an image of a subject or area assigned thereto for observation and generates an image signal in response to the timing signal. Although four cameras 16A to 16D are shown in the figure, there is no limitation as to the number of cameras that may be used.

The image signals produced from the cameras 16A to 16D are coupled to corresponding encoders (each abbreviated as COD in the figure) 18A, 18B, 18C and 18D. Each of the encoders 18A to 18D performs bandwidth compression, in addition to conversion from analog signals to digital signals and encoding of converted signals as typical of an encoder. Similarly to the decoders 61 to 64 at the monitoring site, such an encoder as described above can be formed by a combination of known devices.

The encoded image signals are coupled to the image signal transmitting unit 50, in which image signal processing for transmission is carried out, and thereafter the processed image signals are coupled to the modem 12.

The following should be understood in connection with the remote site. FIG. 1 shows the case where cameras 16A to 16D at the remote sites are controlled by a single pair of units consisting of the instruction signal receiving unit 40 and the image signal transmitting unit 50. However, a large number of cameras may be divided into several groups and a pair of the units 40 and 50 (including the modem 12) is employed for each camera group. The arrangement in each group is effectively the same as that shown in FIG. 1 and in this case, the number of pairs of the units 40 and 50 is the same as that of the camera groups. The units 40 and 50 will be located at selected sites in the plant or building. The modems of each group must be able to communicate with the modem 10 at the monitoring site through a transmission line. To this end, for example, a known loop-formed transmission line can be used, through which all modems, including the modem 10, are connected.

Next, description of the detailed structure of the units 20, 30, 40 and 50 will be described with reference to FIGS. 2, 3, 4 and 5, respectively.

Figure 2:
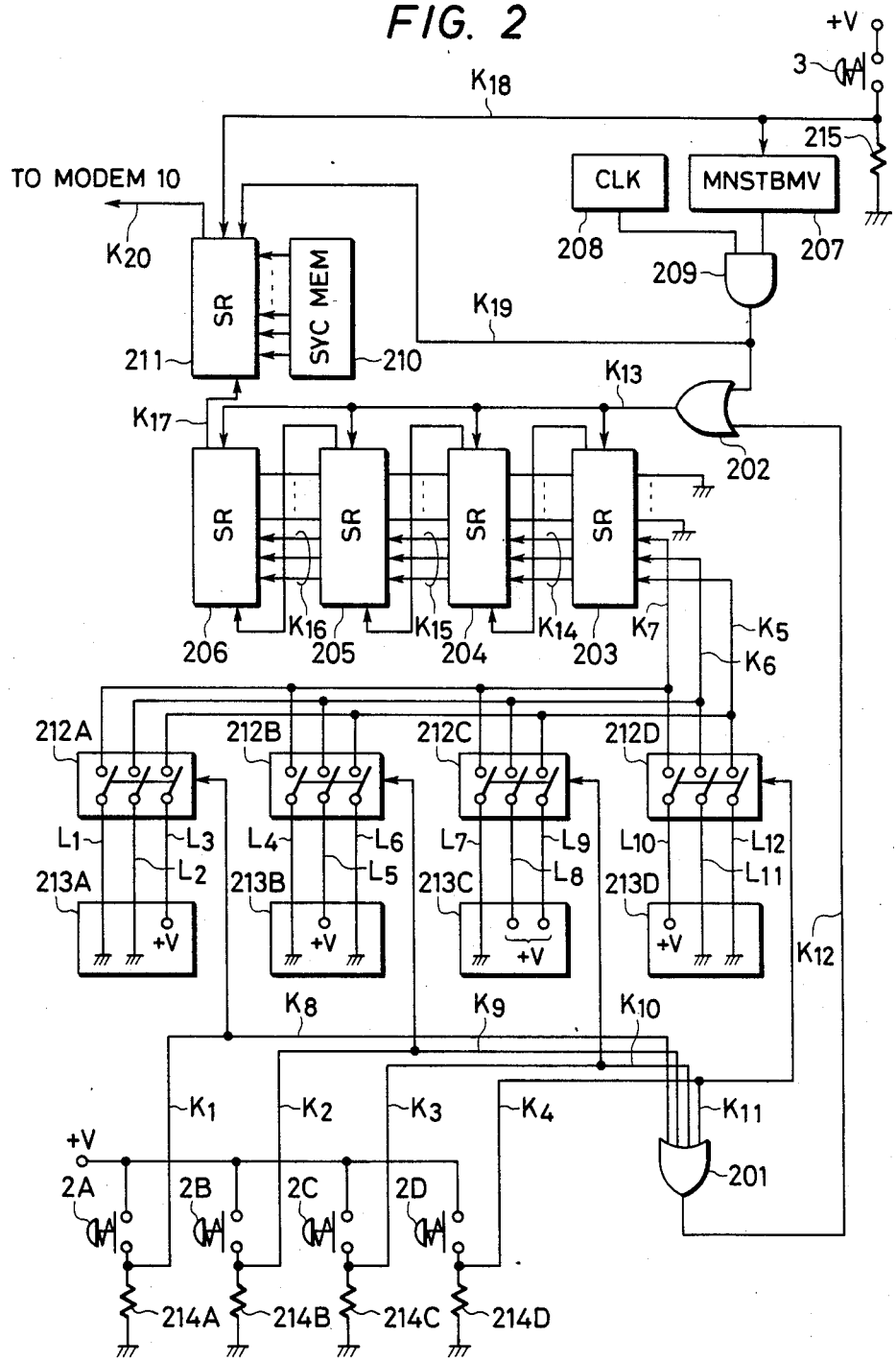
FIG. 2 is a block diagram showing the detailed structure of an instruction signal transmitting unit used in the embodiment of FIG. 1.

The detailed structure of the instruction signal transmitting unit 20 is shown in FIG. 2. Reference numerals 201 and 202 indicate OR gates, and reference numerals 203, 204, 205, 206 and 211 indicate 8-bit shift registers (abbreviated as SR in the figure) capable of transferring data in parallel input—parallel output, parallel input—serial output and serial input—serial output format. Incidentally, all shift reigsters are of the same type as the above registers. Reference numeral 207 indicates a monostable multivibrator (abbreviated as MNSTBMV in the figure), numeral 208 a clock signal oscillator (abbreviated at CLK in the figure), and numeral 2009 an AND gate. Reference numeral 210 indicates a memory for storing a synchronizing signal code SYC (abbreviated as SYC MEN in the figure).

Reference numerals 212A, 212B and 212D denote multiple switches each of which has three pairs of contacts and reference numerals 213A, 213B, 213C and 213D denote code establishing circuits each of which produces a respective code assigned to each of the cameras 16A to 16D. Therefore, if there are more cameras, more code establishing circuits are employed. Also, the number of push-button switches, multiple switches and shift registers will be increased accordingly. However, it should be understood that the manner of connecting these additional elements does not change in spite of an increase in the number of cameras. In particular, if the number of cameras is equal to or less then seven, it is sufficient that three further code establishing circuits which are encoded as "101", "110" and "111", respectively, are connected in parallel with the lines $K_5$ to $K_7$ through multiple switches provided correspondingly thereto and three shift registers are connected in cascade with the shift registers 203 to 206. Further three push-button switches must be provided to actuate the newly provided multiple switches. If the number of cameras exceeds seven, a code of three digits becomes insufficient for assigning a code to each camera. In that case, a code establishing circuit which can generate a code of more than three digits is used.

Each of reference numerals 214A, 214B, 214C, 214D and 215 represents a resistor and a reference +X indicates a positive voltage source. Further, like parts of FIGS. 1 and 2 are identified by the same reference numerals.

Each of the multiple switches 212A to 212D is equipped with three contacts which are connected to the shift register 203 through lines $K_5$, $K_6$ and $K_7$. Lines $L_1$, $L_2$ and $L_3$ connect the three contacts of the multiple switch 212A to the code establishing circuit 213A. In this circuit 213A, lines $L_1$, $L_2$ are connected to ground whereas the line $L_3$ is connected to the positive voltage source +V. As a result, a code A is expressed in the form of a three digit signal "001". Lines $L_4$, $L_5$ and $L_6$ are connected to the three contacts of the multiple switch 212B, respectively. In the code establishing circuit 213B, the lines $L_4$, $L_6$ are connected to ground whereas the line $L_5$ is connected to the positive voltage source +V. As a result, a code B is expressed in the form of a three digit signal "010". In the code establishing circuit 213C, a line $L_7$ is connected to ground and lines $L_8$ and $L_9$, connected to the positive voltage source +V are connected to the three contacts of the multiple switch 212C, respectively. A code C, therefore, is expressed in the form of a three digit signal "011". In the code establishing circuit 213D, a line $L_{10}$, connected with the positive voltage source +V, and lines $L_{11}$ and $L_{12}$, connected to ground, are connected with the three contacts constituting the muliple switch 212D, respectively. A code D is expressed in the form of a three digit signal "100". The shift registers 203 and 204 are connected with each other through three lines $K_{14}$. Three lines $K_{15}$ interconnected the shift registers 204 and 205. The lines $K_{16}$ interconnected the shift registers 205 and 206. The remaining terminal of the 8-bit shift registers 203 to 206 are connected in cascade and grounded. Namely, a dummy of 5 bits each having a logical value of zero is added to the 3-bit signal generated by the code establishing circuits 213A to 213D. Further, the shift register 206 is connected to the shift register 211 through a line $K_{17}$.

A line $K_1$ connects the switch 2A to the multiple switch 212A. A line $K_2$ connects the switch 2B to the multiple switch 212B, a line $K_3$ connects the switch 2C to the multiple switch 212C, and a line $K_4$ connects the switch 2D to the multiple switch 212D. The switches 2A to 2D are connected with the OR gate 201 through lines $K_8$, $K_9$, $K_{10}$ and $K_{11}$, respectively. The OR gate 201 has its output terminal connected to the OR gate 202 through a line $K_{12}$. The OR gate 202 has its output terminal connected to the shift registers 203 to 206 through a line $K_{13}$. The switch 3 is connected to the monostable multivibrator 207 and the shift register 211 through a line $K_{18}$. The monostable multivibrator 207 and the clock signal oscillator 208 are connected to the input terminal of the AND gate 209. This AND gate 209 has its output terminal connected to the input terminal of the OR gate 202. The AND gate 209 is also connected to the shift register 211 through a line $K_{19}$. The SYC memory 210 is connected with between the shift register 211. A line $K_{20}$ provides connection between the shift register 211 and the modem 10.

Figure 3:
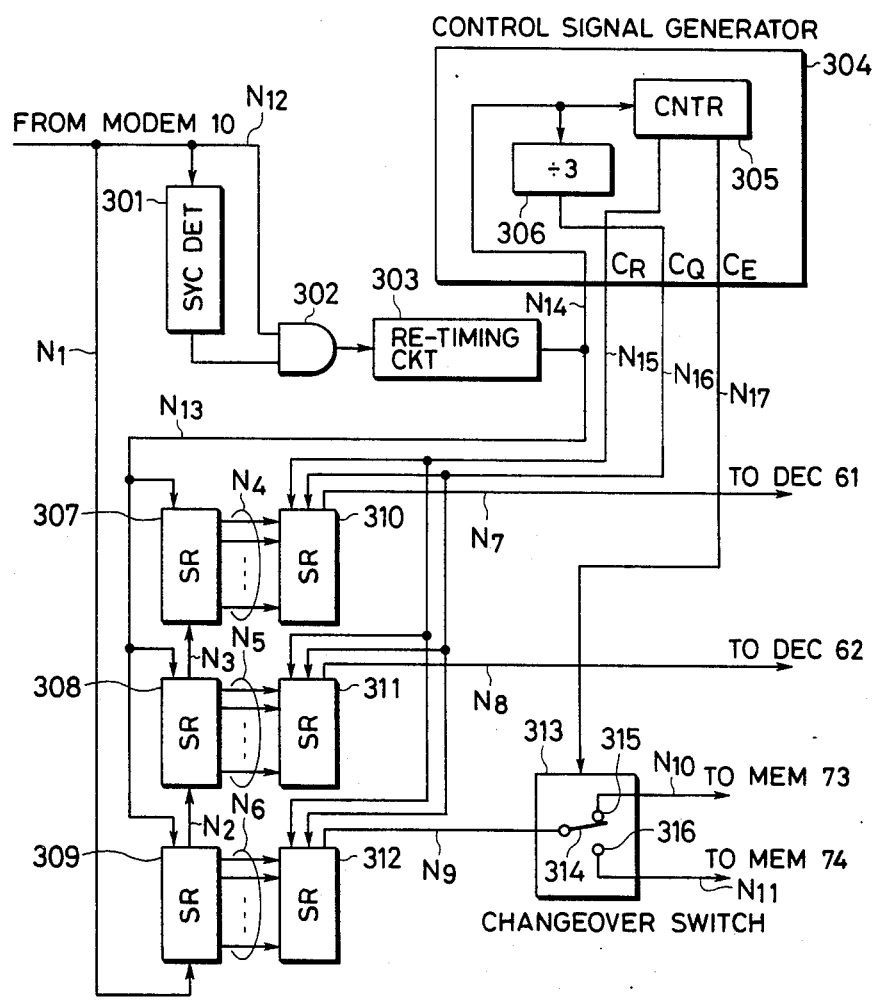
FIG. 3 is a block diagram showing the detailed structure of an image signal receiving unit used in the embodiment of FIG. 1.

Referring next to FIG. 3, the detailed structure of the image signal receiving unit 30 will be explained.

The image signal receiving unit 30 is formed of a synchronizing signal detector (abbreviated as SYC DET in the figure), which detects the synchronizing signal SYC from the signal received by the modem 10 and produces a predetermined output as will as described in detail below. A reference numeral 302 denotes an AND gate, and a reference numeral 303 indicates a re-timing circuit which extracts the clock signal from the image signal received by the modem 10. A technique for extracting a clock signal, a received signal itself, is a well known technique in the field of data transmission. A reference numeral 304 denotes a control signal generator which is composed of a counter (abbreviated as CNTR in the figure) 305 and a frequency divider 306. Reference numerals 307 to 312 represent 8-bit shift registers, and a reference numeral 313 denotes a changeover switch having a moving contact 314 and two fixed contacts 315 and 316. Further, the same reference numerals or characters as those used in FIG. 1 indicate the same component parts as shown in that figure.

The modem 10 (FIG. 1) is connected to the shift register 309 through a line $N_1$. A line $N_2$ provides connection between the shift registers 309 and 308, and a line $N_3$ interconnects the shift registers 308 and 307.

The shift register 307 is connected to the shift register 310 through lines $N_4$. The shift register 308 is connected to the shift register 311 through lines $N_5$. The shift register 309 is connected to the shift register 312 through lines $N_6$. A line $N_7$ connects the shift register 310 to the decoder 61 (FIG. 1). The shift register 311 is connected to the decoder 62 through a line $N_8$. The shift register 312 is connected to the moving contact 314 of the changeover switch 313 through a line $N_9$. The fixed contact 315 of the changeover switch 313 is connected to the image memory 73 (FIG. 1) through a line $N_{10}$ and the other contact 316 to the image memory 74 through a line $N_{11}$.

A line $N_{12}$ connected to the modem 10 (FIG. 1) is connected to one of the input terminals of the AND gate 302. The synchronizing signal detector 301 connected to the line $N_{12}$ is connected with the other input terminal of the AND gate 302. The re-timing circuit 303, connected with the output terminal of the AND gate 302 is connected to the shift registers 307, 308 and 309 through a line $N_{13}$ and with the control signal generator 304 through a line $N_{14}$. In the control signal generator 304, the signal coupled through the line $N_{14}$, which is the clock signal reproduced by the re-timing circuit 303, is counted by the counter 305, so that control signals $C_E$ and $C_R$ are generated in accordance with the contents of the counter 305. The control signal $C_R$ is coupled to the shift registers 310 to 312 through a line $N_{15}$, and the control signal $C_E$ is coupled to the changeover switch 313 through a line $N_{17}$. The control signal $C_E$ functions as a changeover signal which repeatedly changes the connection of the moving contact 314 with the fixed contacts 315 and 316 during a predetermined period. Further, in the control signal generator 304, the frequency divider 306 reduces the frequency of the clock signal down to one third. Namely, the frequency divider 306 produces one output pulse for every three pulses of the clock signal, and the output pulse is coupled to the shift registers 310 to 312 as a control signal $C_Q$ through a line $N_{16}$. As described above, the control signal generator 304 has the function of generating various types of control signals $C_R$, $C_Q$, $C_E$ at respective predetermined timings on the basis of the reproduced clock signal. Therefore, it will be easily understood by one skilled in the art that such a control signal generator may be constructed of a microcomputer which is so programmed as to generate the control signals in the manner as described above.

The above explanation relates to the component parts of the monitor room site, i.e. to the instruction signal transmitting unit 20 and the image signal receiving unit 30. The following explanation relates to the component parts of the remote site to be monitored.

Figure 4:
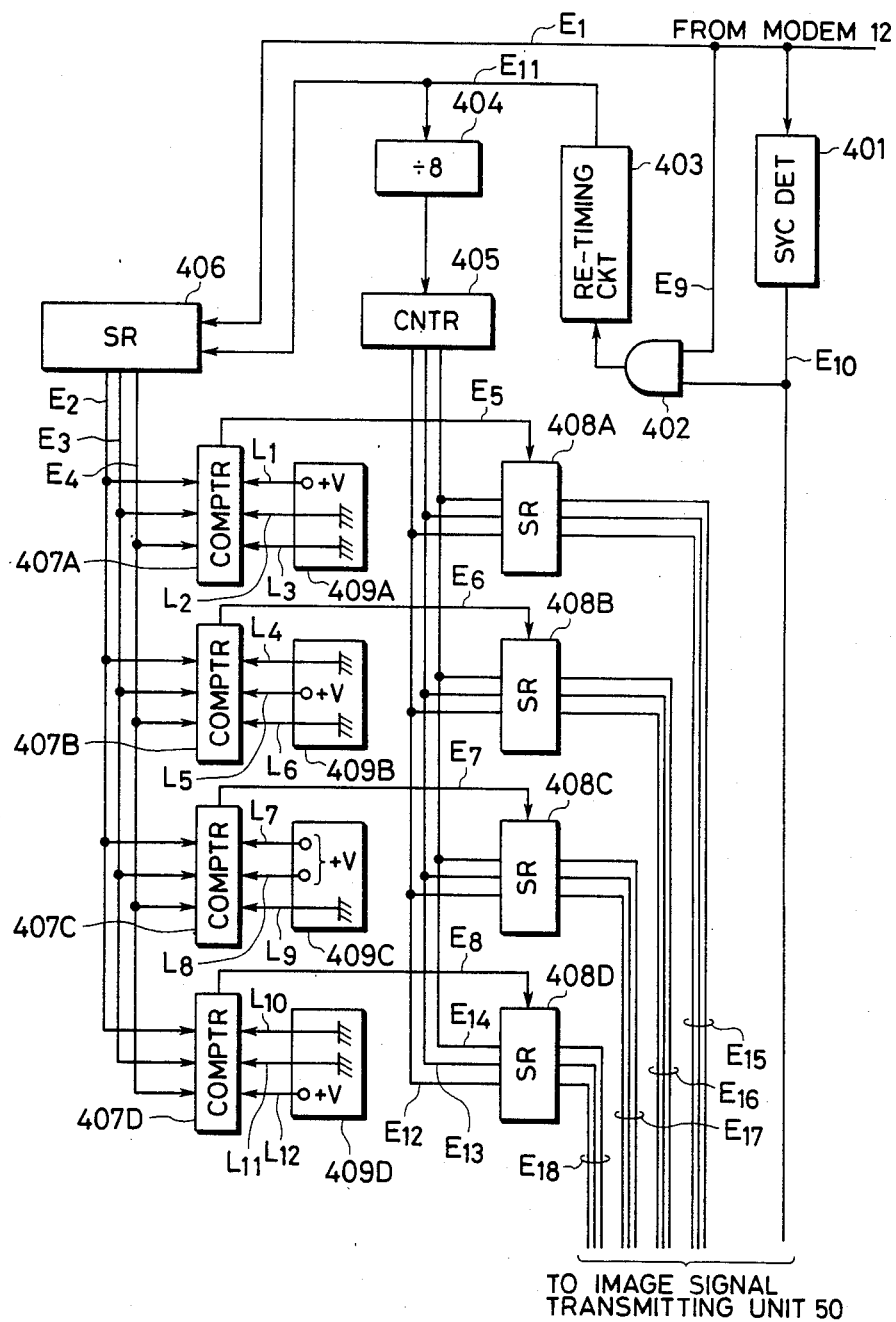
FIG. 4 is a block diagram showing the detailed structure of an instruction signal receiving unit used in the embodiment of FIG. 1.

Referring at first to FIG. 4, the detailed structure of the instruction signal receiving unit 40 will be described. This unit 40 is equipped with a synchronizing signal detector (abbreviated SYC DET in the figure) 401, an AND gate 402, a re-timing circuit 403 which has the same function as the re-timing circuit 303 in FIG. 3, a ⅛ frequency divider 404, a counter (abbreviated as CNTR) 405, a shift register (abbreviated as SR) 406, comparators (abbreviated as COMPTR) 407A, 407B, 407C and 407D, shift registers (similarly abbreviated as SR) 408A, 408B, 408C and 408D, and code establishing circuits 409A, 409B, 409C and 409D, which have the same structure as circuits 213A to 213D of FIG. 2 and produce the output signals (code) corresponding thereto, respectively. Further, the same reference numerals used in FIG. 1 indicate the same component parts as shown in that figure.

The modem 12 (FIG. 1) is connected to the shift register 406 through a line $E_1$. Lines $E_2$, $E_3$ and $E_4$ connected to the shift register 406 are connected to the comparators 407A to 407D. Lines $L_1$, $L_2$ and $L_3$ connect the code establishing circuit 409A with the comparator 407A. similarly, lines $L_4$ to $L_6$ connect the code establishing circuit 409B with the comparator 407B. Further, lines $L_7$ to $L_9$ connect the circuit 409C with the comparator 407C and lines $L_{10}$ to $L_{12}$ connect the circuit 409D with the comparator 407D. These comparators 407A to 407D have their respective output terminals connected to the shift registers 408A to 408D through lines $E_5$ to $E_8$, respectively. The AND gate 402 has two input terminals, one being connected to the line $E_1$ through a line $E_9$ and the other to the synchronizing signal detector 401 through a line $E_{10}$. An output terminal of the AND gate 402 is connected to the re-timing circuit 403. The re-timing circuit 403 is connected with the frequency divider 404 and the shift register 406 through a line $E_{11}$. Lines $E_{12}$ to $E_{14}$ connected to the counter 405 are led to the shift registers 408A to 408D. Three lines $E_{15}$ are connected to the shift register 408A, three lines $E_{16}$ are connected to the shift register 408B, three lines $E_{17}$ to the shift register 408C, and three lines $E_{18}$ are connected to the shift register 408D. These four set of three lines $E_{15}$ to $E_{18}$ and the line $E_{10}$ are coupled to the image signal transmitting unit 50.

Figure 5:
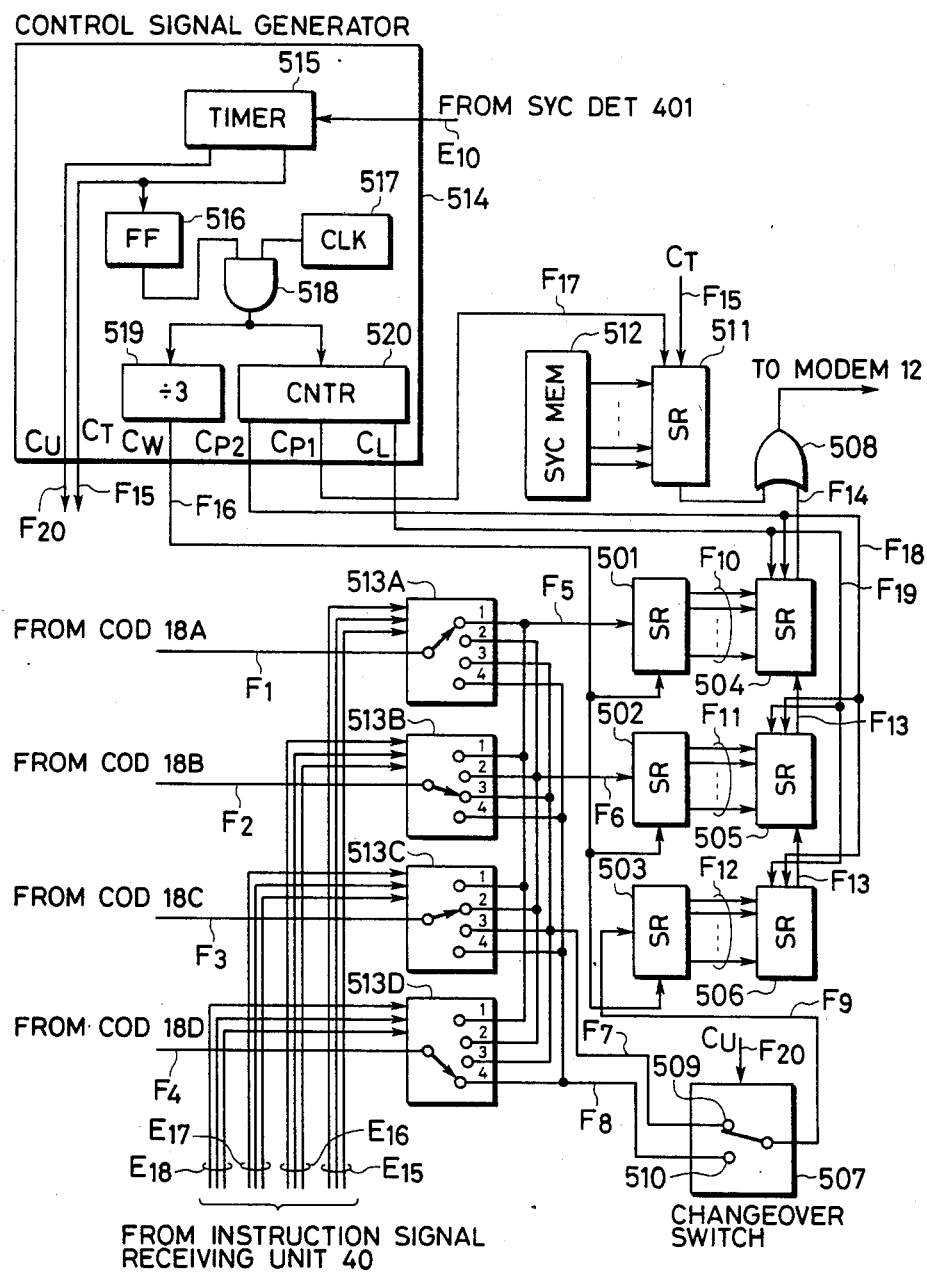
FIG. 5 is a block diagram showing the detailed structure of an image signal transmitting unit used in the embodiment of FIG. 1.

In FIG. 5, there is shown the structure of the image signal transmitting unit 50, which comprises shift registers (abbreviated as SR in the figure) 501 to 506 and 511, an OR gate 508, a changeover switch 507 having a moving contact and two fixed contacts 509 and 510 as the changeover switch 313 (FIG. 3), a synchronizing signal memory (abbreviated as SYC MEM) 512 which is similar to the memory 210 (FIG. 2), selecting switch circuits 513A, 513B, 513C and 513D, and a control signal generator 514. The control signal generator 514 has a timer 515 initiated by the synchronizing signal SYC from the detector 401 (FIG. 4), a flip-flop circuit (abbreviated as FF) 516, a clock signal oscillator (abbreviated as CLK) 517, an AND gate 518, a ⅓ frequency divider 519 and a counter (abbreviated as CNTR) 520. The control signal generator 514 has a function of generating various types of timing and control signals $C_L$, $C_{P1}$, $C_{P2}$, $C_W$, $C_T$ and $C_U$ at respective predetermined timings, to be described below, initiated by the synchronizing signal SYC. Therefore, similar to the case of the control signal generator 304 in FIG. 3, this control signal generator also can be constructed of a microcomputer which is so programmed as to generate the timing and control signals in the manner as described above. Further, the same reference numerals as used in FIGS. 1 and 4 indicate the same component parts as shown in those figures.

The switch circuit 513A has a movable contact connected to the encoder 18A (FIG. 1) through a line $F_1$. The switch circuit 513B has a movable contact connected to the encoder 18B through a line $F_2$. The switch circuit 513C has a movabl contact connected to the encoder 18C through a line $F_3$. The switch circuit 513D has a movable contact connected to the encoder 18D through a line $F_4$. A line $F_5$ connected to respective fixed contacts 1 of the switch circuits 513A to 513D is coupled to the shift register 501. A line $F_6$ connected to respective fixed contacts 2 of the switch circuits 513A to 513D is coupled to the shift register 502. A line $F_7$ connected to respective fixed contacts 3 of the switch circuits 513A to 513D is coupled to a fixed contact 509 of the changeover switch 507. A line $F_8$ connected to respective fixed contacts 4 of the switch circuits 513A to 513D is coupled to the other fixed contact 510 of the changeover switch 507. A line $F_9$ connected to the movable contact of the changeover switch 507 is coupled to the shift register 503. The shift registers 501 and 504 are connected to each other through lines $F_{10}$, the shift registers 502 and 505 are connected to each other through lines $F_{11}$, and the shift registers 503 and 506 are connected to each other through lines $F_{12}$. Further, the shift registers 504 to 506 are connected in series with one another through lines $F_{13}$. The shift register 504 has an output terminal connected to one of the input terminals of the OR gate 508 through a line $F_{14}$. This OR gate 508 has an output terminal connected to the modem 12 (FIG. 1).

A line $F_{15}$ connected to the control signal generator 514 is coupled to the cameras 16A to 16D (FIG. 1) and the shift register 511. A line $F_{16}$ provides a connection between the shift registers 501 to 503 and the control signal generator 514. A line $F_{17}$ from the control signal generator 514 is coupled to the shift register 511. Lines $F_{18}$ and $F_{19}$ from the control signal generator 514 are both connected with the shift registers 504 to 506. The control signal generator 514 and the changeover switch 507 are connected to each other through a line $F_{20}$. The lines $E_{15}$ to $E_{18}$ connected to the shift registers 408A to 408D of the instruction signal receiving unit 40 (FIG. 4), respectively, are connected to the selecting switch circuits 513A to 513D. In response to a signal coupled through the corresponding one of the lines $E_{15}$ to $E_{18}$, each movable contact of the selecting switch circuits 513A to 513D selects one contact among the fixed contacts 1 to 4.

In the control signal generator 514, the timer 515 starts counting the time upon receipt of a signal from the synchronizing signal detector 401 (FIG. 4) and produces an output signal after a period corresponding to the duration in which the logic operation in the instruction signal receiving unit 40 is completed and thereby the signals of the lines $E_{15}$ to $E_{18}$ are produced. This output signal of the timer 515 becomes the signal $C_T$ which is coupled to the cameras 16A to 16D (FIG. 1) and the shift register 511 through the line $F_{15}$. The timer 515 produces a further output at a predetermined time after production of the signal $C_T$. Another output of the timer 515 becomes the signal $C_U$ coupled to the changeover switch 507 as a changeover signal through the line $F_{20}$. When the timer 515 produces the signal $C_T$, the flip-flop circuit 516 is set, so that the clock signal from the clock oscillator 517 is coupled to the ⅓ frequency divider 519 and the counter 520 through the AND gate 518. The clock signal whose frequency is reduced down to one-third is coupled to the shift registers 501 to 503 as the signal $C_W$ through the line $F_{16}$. The counter 520 counting the clock signal produces the signals $C_L$, $C_{P1}$ and $C_{P2}$ in accordance with its contents. The signals $C_L$ and $C_{P2}$ are coupled to the shift registers 504 to 506 through the line $F_{19}$ and $F_{18}$, respectively, and the signal $C_1$ is coupled to the register 511 through the line $F_{17}$.

Next, the monitoring operations of the plant by the image transmission system having the structure thusfar described according to the present embodiment will be described.

Referring back to FIG. 2, when an operator at the monitoring site depresses the push-button switches in the order of, for example, 2A, 2C, 2B and 2D, electrical current flows through the lines $K_1$, $K_3$, $K_2$ and $K_4$ one after another to render the multiple switches conductive in the order of 212A, 212C, 212B and 212D while current is flowing. The three contacts of each multiple switch are simultaneously closed. As those multiple switches are closed, codes "A", "C", "B" and "D" set in the code establishing circuits 213A, 213C, 213B and 213D are input to the shift registers 203 through the lines $K_5$ to $K_7$. Here, all the circuits of the instruction signal transmitting unit 20 including the shift registers and the monostable multivibrator are assumed to be reset under the initial conditions. The reset signals and their input terminals are not shown. The initial values are reset as explained below. The codes thus input to the shift register 203 are then transferred sequentially to the shift registers 204 to 206 through the lines $K_{14}$, $K_{15}$ and $K_{16}$. These code shifting operations among the shift registers 203 to 206 are conducted by applying the ON signals of the switches 2A to 2D to the shift registers 203 to 206 through the OR gate 201, the line $K_{12}$, the OR gate 202 and the line $K_{13}$.

Figure 6:
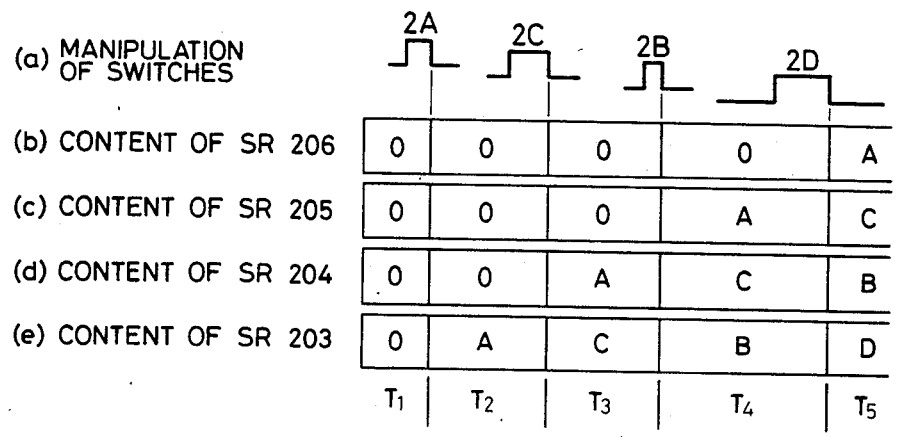
FIG. 6 is an explanatory chart showing the states of storing the signals in shift registers included in the instruction signal transmitting unit shown in FIG. 2.

FIG. 6 shows the states in which the shift registers 203 to 206 are being stored with the respective codes by closing the switches 2A, 2C, 2B and 2D. The duration denoted by $T_1$ indicates the state before the switches are depressed (i.e., while all the switches are open), in which the shift registers 203 to 206 closed the value "0". The duration denoted by $T_2$ shows the state after the switch 2A is closed whereas the remaining switches are left open, in which the shift register 203 stores the code "A". The duration denoted by $T_3$ shows the state after the switch 2C is closed whereas the remaining switches are all open, in which the shift register 204 stores the code "A", whereas the shift register 203 stores the code "C". The duration denoted by $T_4$ indicates the state after the switch 2B is closed whereas the remaining switches are open, in which the shift register 205 stores the code "A", the shift register 204 stores the code "C", and the shift register 203 stores the code "B". Finally, the duration denoted by $T_5$ indicates the state after the switch 2D is closed, whereas the remaining switches are all open in which the shift registers 206, 205, 204 and 203 store the codes "A", "C", "B" and "D", respectively.

It is to be noted here that the order of the codes "A", "B", "C" and "D" stored in the shift registers 206 to 203 can be arbitrarily changed by varying the order of manipulation of the switches 2A to 2D by the operator. This manipulation order has significance in the assignment of transmission channels. Namely, in this embodiment, the frequency bandwidth of the transmission line 14 is divided into three transmission channels and as will be understood from the explanation below, two of the three channels are assigned to the transmission of image signals for full motion image (called a full motion image transmission, hereinafter) and the remaining one channel is assigned for image signal transmission for frame repetition images (called a frame repetition image transmission, hereinafter). This assignment of transmission channels is determined by the order of storing the codes "A" to "D" in the shift registers 206 to 203, that is to say, the order of manipulation of the switches 2A to 2D. In this embodiment, therefore, the image signals generated by the camera 16A and 16C which are initially selected can be transmitted by full motion image transmission through two channels. The image signals generated by the camera 16B and 16D are transmitted on a time-sharing basis through one channel by way of frame repetition transmission.

Figure 7:
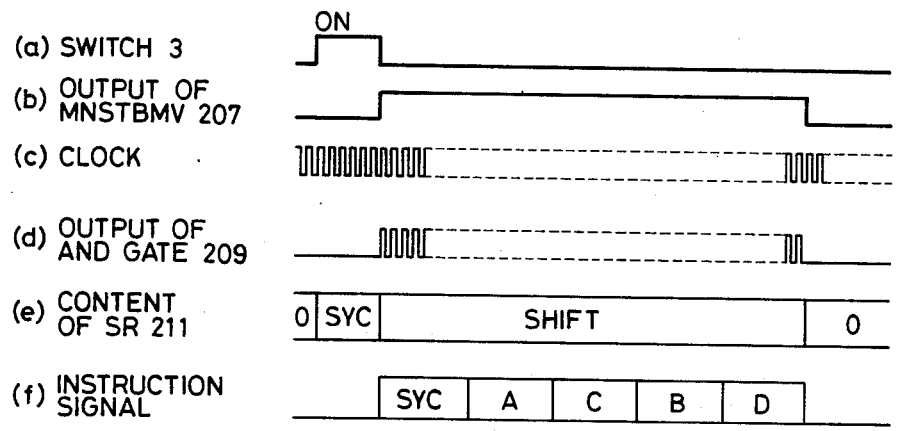
FIG. 7 is a timing diagram showing the operation of the instruction signal transmitting unit shown in FIG. 2.

After the switches 2A to 2D have been operated, as described above, switch 3, which has been left open, is closed by the operator. The operation of the instruction signal transmitting unit 20 after operation of the switch 3 will be explained, referring to FIG. 7. When the switch 3 is closed (FIG. 7(a)), the monostable FIG. 7(b). The time during which the output signal of the multivibrator 207 is high, i.e. the so-called time constant of the multivibrator 207, is determined in dependence on the length of the instruction signal described later in reference to FIG. 7(f). The clock signal oscillator 208 output the clock signal which is shown in FIG. 7(c). As a result, the AND gate 209 outputs the signal which is shown in FIG. 7(d). The shift register 111 receives the ON signal of the switch 3 through the line $K_{18}$ to store the synchronizing signal SYC which is read out from the memory 210. The pulse signal supplied from the AND gate 209 is transmitted through the lines $K_{13}$ and $K_{19}$ to the shift registers 203 to 206 and 211. In response to the pulse signal, these shift registers 203 to 206 and 211 conduct their shifting operations. In FIG. 7(e), this operation is shown as change of contents of the register only with respect to the shift register 211. As a result of the shifting operation, the synchronizing signal SYC and the codes stored in the shfit registers 211, 206, 205, 204 and 203 are shifted from the shift register 211 to the modem 10 sequentially in the order as shown in FIG. 7(f). The code signal "D" last stored in the shfit register 203, for example, is shifted in the order of the shift registers 204, 205, 206 and 211. The signal thus shifted out of the shift register 211 to the line $K_{20}$ by the shifting operations becomes the instruction signal which is headed by the synchronizing SYC followed by respective one-byte signals set with the codes A, C, B and D, respectively as shown in FIG. 7(f). The shift registers 203 to 206 and 211, the multiple switches 212A to 212D and the code establishing circuits 213A to 213D have functions to prepare and output the instruction signals for assigning the full motion images and the frame repetition images. As will be described later, the codes stored in the shift registers 206 and 205 correspond to the full motion images whereas the codes stored in the shift registers 204 and 203 correspond to the frame repetition images, more specifically, the two codes A and C following the synchronizing signal SYC of the instruction signal are assigned to the full motion images, whereas the subsequent two codes B and d are assigned to the frame repetition images.

Here, the following is to be noted with respect to the instruction signal transmitting unit 20. In FIG. 2, the structure of this unit 20 is illustrated as a combination of various types of discrete circuits for the purpose of facilitating a better understanding of the function of instruction signal generation. Briefly speaking, as is described above, the generation of the instruction signal comprises the following steps. Namely, at a first step, the code signals assigned to the cameras equipped at the sites to be monitored are produced in accordance with the order of selection of the cameras, i.e. the order of manipulation of the push-button switches 2A to 2D. In a second step, the synchronizing signal SYC is inserted at the head of the train of the code signals. Finally, the thus obtained instruction signal is sent to the modem 10. As will be understood, the instruction signal can be attained by a microcomputer which is so programmed as to execute the above steps.

Figure 8:
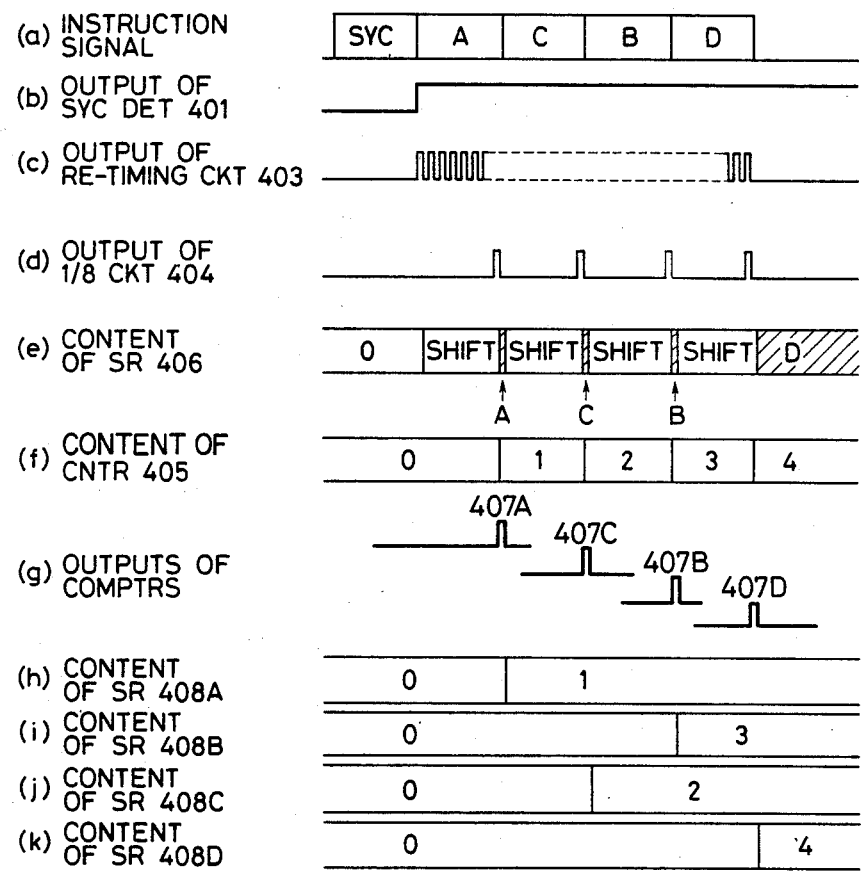
FIG. 8 is a timing diagram showing the operation of the instruction signal receiving unit shown in FIG. 4.

The instruction signal is transmitted through the transmission line 14 to the modem 12 of the site to be monitored and further to the instruction signal receiving unit 40. Next, referring to FIGS. 4 and 8, the operation of the instruction signal receiving unit 40 will be described.

In the instruction signal receiving unit 40, the received instruction signal as shown in FIG. 8(a) is coupled to the synchronizing signal detector 401 and the shift register 406. Detector 401 detects the synchronizing signal SYC and generates a signal which is shown in FIG. 8(b). The re-timing circuit 403 having received the output of the detector 401 through the AND gate 402 reproduces the clock signal which is shown in FIG. 8(c). The ⅛ frequency divider 404 divides the frequency of the reproduced clock signal to generate the signal which is shown in FIG. 8(d). The counter 405 counts the output of the ⅛ frequency divider 404 to produce the counted values as 1, 2, 3 and 4 sequentially, as shown in FIG. 8(f). The shift register 406 receives the reproduced clock signal through the line $E_{11}$, so that the instruction signal is shifted thereinto. However, it is to be noted here that, as is apparent from FIG. 8(c), the clock signal is not yet reproduced when the synchronizing signal SYC reaches the shift register 406. Accordingly, the synchronizing signal SYC is not shifted into the shift register 406, but the register 406 loads only the code signals A to D following the synchronizing signal SYC, bit by bit, in response tot he clock signal. The change of the contents of the shift register 406 is shown in FIG. 8(e). The portions indicated by "shift" in FIG. 8(e) represent that the digital signals composing the respective codes are shifted sequentially in the shift register 406. To the lines $E_2$, $E_3$ and $E_4$, there are separately coupled the three binary signals representative each code. The following description will be made of the case in which the code "A" composed of "001" is coupled from the shift register 406, as has been described hereinbefore. Then, the values "0", "0" and "1" are simultaneously coupled to the lines $E_2$ to $E_4$, respectively. The respective comparators 407A to 407D generate output signals only when the signal coupled from the shift register 406 and the output signals of the code establishing circuits 409A to 409D are coincident with each other. since, in the example of this embodiment, the code signals are arranged in the order of "A", "C", "B" and "D", the comparators 407A to 407D sequentially generate the signals as shown in FIG. 8(g).

The output of the counter 405 is coupled to all the shift registers 408A to 408D. The outputs of the comparators 407A to 407D are also coupled to the corresponding shift registers 408A to 408D as an input timing signal. In response to the timing signal, the shift registers 408A to 408D are loaded with the contents of the counter 405 at that time. Consequently, the shift registers 408A to 408D store the counted values, as shown in FIGS. 8(h) to 8(k). In this embodiment, the counted values are 1, 3, 2 and 4, respectively. As described above, the counter 405, the comparators 407A to 407D and the shift registers 408A to 408D select the cameras for full motion images and the cameras for frame repetition images in response to the instruction signal mentioned above. For the camera 16A, the counter 405, the comparator 407A and the shift register 408A determined whether full motion or frame repetition image signals are to be generated. For the camera 16B, the counter 405, the comparator 407B and the shift register 408B determined whether full motion or frame repetition image signals are to be generated. The counter 405, the comparator 407C and the shift register 408C determined whether the camera 16C is to generate signal for full motion or frame repetition images. The counter 405, the comparator 407D and the shift register 408D determined whether the camera 16D is to generate signals representative of full motion or frame repetition images.

Briefly speaking, as described above, the instruction receiving unit 40 discriminates the order of the code signals A to D included in the received instruction signal. To this end, this unit 40 has the function of decoding the instruction signal which comprises the following steps: generating the codes corresponding to the codes assigned to the cameras; comparing each of the thus generated codes with the successively received code signals one after another; and discriminating the order of reception of the code signals on the basis of the above comparison to produce a contact selecting signal to the selecting switch circuits. All of these steps can be achieved by a microcomputer, so that, similarly to the instruction signal transmitting unit 20 shown in FIG. 2, the instruction signal receiving unit 40 also can be constructed by a microcomputer which is so programmed as to execute the above mentioned steps.

Figure 9:
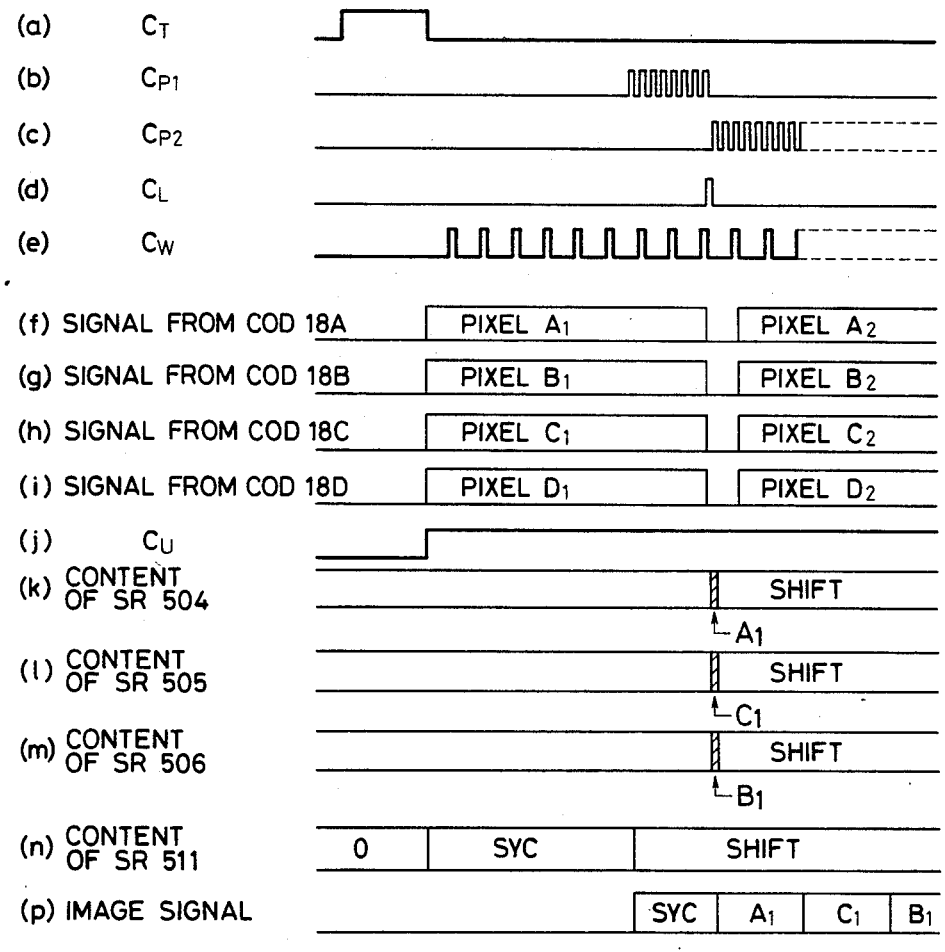
FIG. 9 is a timing diagram showing the operation of the image signal transmitting unit shown in FIG. 5.

Now, the contents stored in the shift registers 408A to 408D are coupled to the image signal transmitting unit 50 through the lines $E_{15}$ to $E_{18}$. In this unit 50, the image signals which are picked up by the cameras 16A to 16D and converted into the digital signals by the coders 18A to 18D are processed to be formed into an image signal suitable for transmission to the image signal receiving unit 30 in the monitoring site in accordance with the instruction signal decoded in the instruction signal receiving unit 40, as mentioned above. The operation of the image signal transmitting unit 40 will be explained in the following, referring to FIGS. 5 and 9.

In FIG. 5, the signals which are coupled through the lines $E_{15}$ to $E_{18}$ are coupled to the selecting switch circuits 513A to 513D as the contact selecting signals, respectively. Each of these signals determines one of four fixed contacts to be selected by the movable contacts. Although, as is apparent from the foregoing description, each of these signals represents one of the numerical values 1 to 4, the numerical value corresponds to the number of the fixed contact to be selected as shown in the figure. Accordingly, the signal transmitted through the line $E_{15}$ is coupled to the switch circuit 513A. This switch circuit 513A connects the movable contact to the fixed contact number 1 since the numerical value of this signal is 1. Since the switch circuit 513B receives the signal through the line $E_{16}$, which represents the numerical value 3, the movable contact thereof selects the fixed contact number 3. Similarly, since the switch circuit 513C receives the signal through the line $E_{17}$, which represents the numerical value 2, the movable contact thereof is connected to the fixed contact number 2. Further, since the switch circuit 513D receives the signal through the line $E_{18}$, which represents the numerical value 4, the movable contact selects the fixed contact number 4. The selecting switch circuits 513A to 513D are switching means to connect the respective cameras with a full motion or a frame repetition image transmission means in accordance with the aforementioned camera selecting function of the instruction signal receiving unit 40.

The image signal output from the cameras 16A to 16D is synchronized with the signal $C_T$ as shown in FIG. 9(a), which is transmitted from the control signal generator 514 through the line $F_{15}$. As has been already described, the signal $C_T$ is coupled from the control signal generator 514 after the signals on the lines $E_{15}$ to $E_{18}$ have been produced. Moreover, the signal $C_T$ is coupled through the line $F_{15}$ to the shift register 511. This shift register 511 receives and stores the synchronizing signal SYC from the memory 512. The image signals generated by the cameras 16A to 16D are coupled to the encoders 18A to 18D so that they become pixel signals which are shown in FIGS. 9(f) to 9(i). The pixel signal coupled from the encoder 18A is coupled to the shift register 501 through the lines $F_1$ and $F_5$. The pixel signal coupled from the encoder 18C is coupled to the shift register 502 through the lines $F_3$ and $F_6$. The pixel signal coupled from the encoder 18B is transmitted to the changeover switch 507 through the lines $F_2$ and $F_7$. The pixel signal coupled from the encoder 18D is transmitted to the changeover switch 507 through the lines $F_4$ and $F_8$. As described above, the changeover switch 507 has its movable contact connected alternately at a predetermined frequency with the fixed contact 509 connected to the line $F_7$ and the fixed contact 510 connected to the line $F_8$. This switching operation of the movable contact is conducted each time the image signals from the encoders 18B and 18D are transmitted for one picture frame. This switching operation of the movable contact of the changeover switch 507 is conducted in response to the signal $C_U$ which is coupled from the control signal generator 514 to the changeover switch 507 through the line $F_{20}$. Here it is that the movable contact of the changeover switch 507 will be connected with the fixed contact 509. Then, the pixel signal from the encoder 18B is coupled to the shift register 503. The storage of the pixel signals in the shift registers 501 to 503 is conducted in synchronism with the signal $C_W$, as shown in FIG. 9(e), which is coupled from the control signal generator 514 after the signal $C_T$ has the value "0". When a signal $C_L$ shown in FIG. 9(d) is coupled to the shift registers 504 to 506, pixel signals $A_1$, $C_1$ and $B_1$ stored in the shift registers 501 to 503 are transferred to and stored in the corresponding shift registers 504 to 506 (as shown in FIGS. 9(k) to 9(m)). The shift registers 501, 502, 504 and 505 are storage means for the full motion images. The switching circuit 507 and the shift registers 503 and 506 form storage means for the frame repetition images.

Before the signal $C_L$ is coupled from the control signal generator 514, a signal $C_{P1}$ is coupled from the same, as shown in FIG. 9(b). The shift register 511 receives the signal $C_{P1}$ through the line $F_{17}$ to couple the stored synchronizing signal SYC to the modem 12 through the OR gate 508. The signal $C_{P1}$ is interrupted simultaneously with the interruption of the signal $C_L$. As soon as the signal $C_{P1}$ is interrupted, a signal $C_{P2}$ is coupled from the control signal generator 514. When the signal $C_{P2}$ is coupled to the shift registers 504 to 506, the pixel signals $A_1$, $C_1$ and $B_1$ stored in those shift registers are transmitted in series to the modem 12 through the OR gate 508. As a result, an image signal headed by the synchronizing signal SYC, as shown in FIG. 9(p), is coupled from the modem 12 to the transmission line 14.

Figure 10:
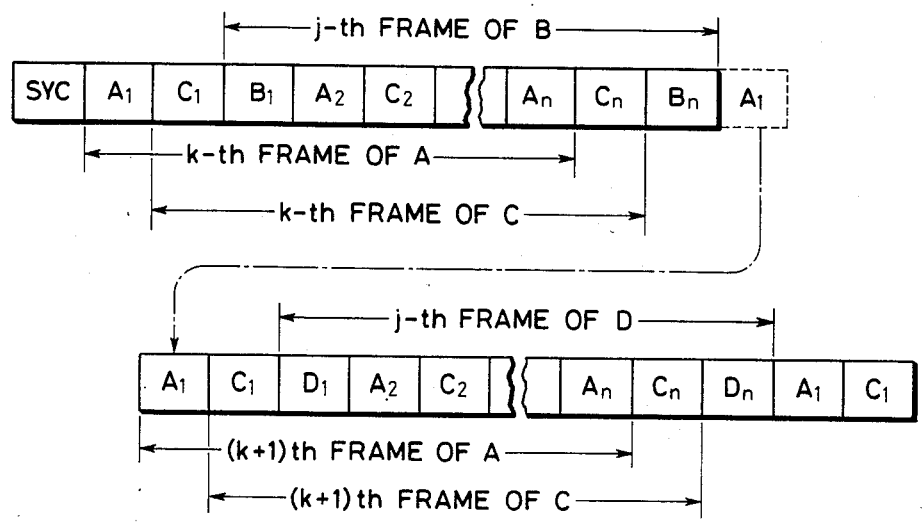
FIG. 10 is a framed diagram of the detailed formation of an image signal provided by the image signal transmitting unit shown in FIG. 5.

The details of the image signal outputted from the modem 12 are shown in FIG. 10. This figure shows the formation of the image signal of k-th and (k+1)th frames with respect to the image signals generated by the cameras 16A and 16C which are both transmitted by the full motion image transmission and a j-th frame with respect to the image signals B and D generated by the cameras 16B and 16D which are transmitted by the frame repetition image transmission. When the pixel signals $A_1$, $C_1$ and $B_1$ are coupled from the shift register 504, they are accompanied by successive pixel signals $A_2$, $C_2$ and $B_2$ until pixel signals $A_n$, $C_n$ and $B_n$ are finally produced. The pixel signals $A_1$ to $A_n$ form one frame of the image A, the pixel signals $C_1$ to $C_n$ form one frame of the image C, and the pixel signals $B_1$ to $B_n$ form one frame of the image B. When the pixel signal $B_n$ is coupled, the movable contact of changeover switch 507 is connected with the fixed contact 510 thereof, so that the pixel signal $D_1$ is stored in the shift register 503 and further in the shift register 506. As a result, the pixel signals $A_1$, $C_1$, $D_1$, $A_2$, $C_2$, $D_2$ and so on are produced sequentially in the same manner as described above.

A variation of assignment of channels to the full motion image and the frame repetition image transmissions can be achieved by changing the wiring between the selecting switch circuits 513A to 513D and the shift registers 501, 502 and the changeover switch 507. If a changeover switch having three fixed contacts is substituted for the two-fixed-contact changeover switch 507 as used in FIG. 5 and the line $F_6$ is connected to a third fixed contact thereof, only one channel need be assigned for full motion image transmission, and the remaining two channels may be employed for frame repetition image transmission.

Further, another variation can be considered. Where the transmission line 14 is divided into more than three channels, there must be provided a number of selecting switch circuits corresponding to the number of channels. The number of fixed contacts of each of such selecting switch circuits also must correspond to the number of channels. On the other hand, the number of fixed contacts of the changeover switch is determined in dependence on how many channels are assigned to the full motion image transmission. For example, where the transmission line is divided into 50 channels and two channels thereamong are assigned to full motion image transmission, 48 fixed contact are necessary in the changeover switch. The wiring between the selecting switch circuits and the changeover switch can be easily done in accordance with that shown in FIG. 5. In this case, the arrangement of the shift registers 501 to 506 does not change, since two channels are assigned to full motion image transmission in the same manner as in FIG. 5 and a single shift register for storing the image signal of the frame repetition image is used by changing the image signals for every frame repetition image transmission. These modifications and variations mentioned above can be easily performed by one skilled in the art without the exercise of invention.

Figure 11:
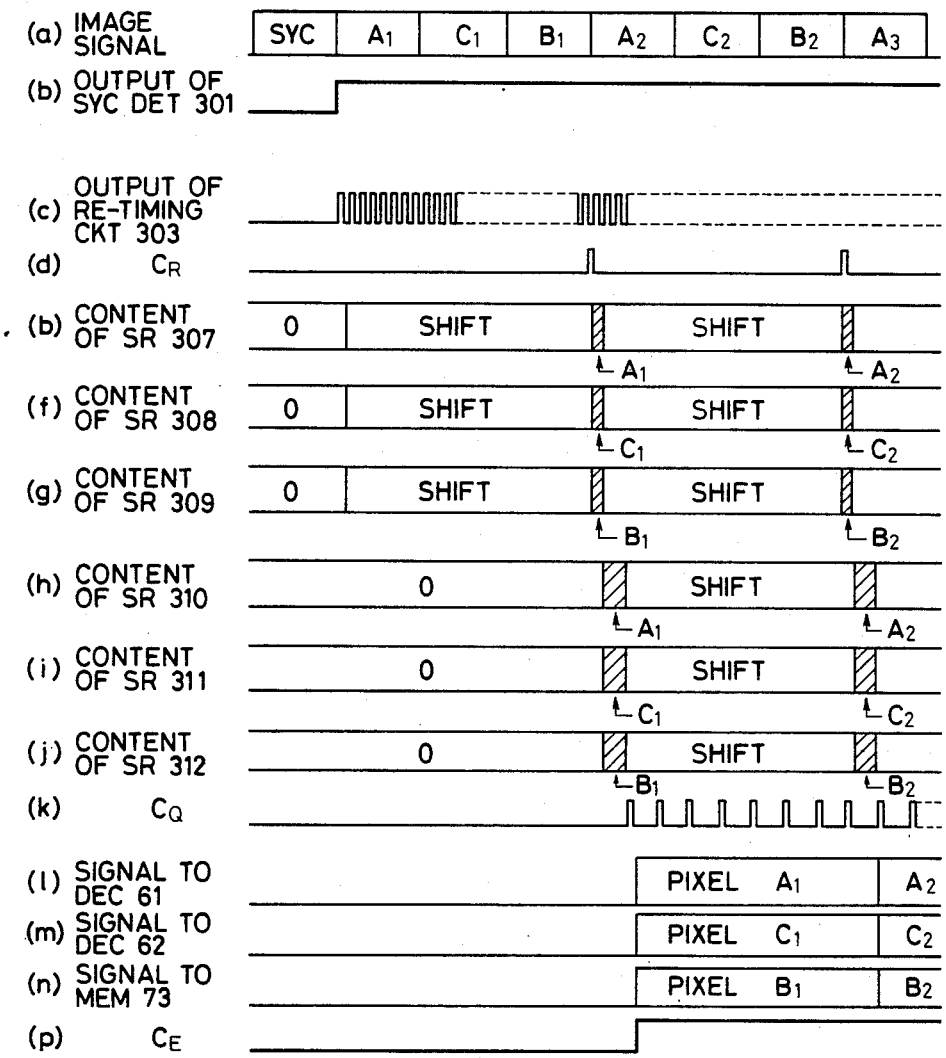
FIG. 11 is a timing diagram showing the operation of the image signal receiving unit shown in FIG. 3.

The above mentioned image signal obtained in the image signal transmitting unit 50 is transmitted from the modem 12 through the transmission line 14 to the monitoring site and received by the modem 10. Next, the operation of the image signal receiving unit 30 which is supplied with the image signal received by the modem 10 will be described, referring to FIGS. 3 and 11.

The image signal received by the modem 10 is coupled to the shift register 309 through the line $N_1$ and the synchronizing signal detector 301 through the line $N_{12}$. This synchronizing signal detector 301 receives the image signal as shown in FIG. 11(a) to generate a signal as shown in FIG. 11(b). This output is coupled through the AND gate 302 to the re-timing circuit 303. This circuit 303 generates a clock pulse signal which is shown in FIG. 11(c). This pulse signal is coupled to the control signal generator 304 as well as to the shift registers 307 to 309 store the pixel signals $A_1$, $C_1$ and $B_1$. More specifically, the shift register 307 stores the pixel signals $(A_1, A_2, \ldots,$ and $A_n)$ pixel by pixel, as shown in FIG. 11(e). The shift register 308 stores the pixel signals $(C_1, C_2, \ldots,$ and $C_n)$ pixel by pixel, as shown in FIG. 11(f). The shift register 309 stores the pixel signals $(B_1, B_2, \ldots,$ and $B_n)$ pixel by pixel, as shown in FIG. 11(g). Here, it is to be noted that the synchronizing signal SYC included in the received image signal is loaded into the shift register 307 to 309, since the clock signal is not yet reproduced when the synchronizing signal SYC is coupled with shift register 309.

A signal $C_R$ (as shown in FIG. 11(d)) is coupled from the control signal generator 304 and coupled to the shift registers 310 to 312. In response to the signal $C_R$, the shift registers 310 to 312 store the pixel signals $A_1$, $C_1$ and $B_1$ stored in the corresponding shift registers 307 to 309, as shown in FIGS. 11(h) to (j). Next, a signal $C_Q$ (as shown in FIG. 11(k)) generated from the control signal generator 304 is coupled to the shift registers 310 to 312. At this time, the pixel signal stored in shift registers 310 to 312 are shifted out. The pixel signals $(A_1, A_2, \ldots,$ and $A_n)$ shifted sequentially from the shift register 310 are transmitted as the image signal to the decoder 61. The decoder 61, decodes and decompresses the digital, bandwidth-compressed image signal, so that the television monitor 81 displays the image which has been detected by the camera 16A. The pixel signals $(C_1, C_2, \ldots,$ and $C_n)$ shifted out from the shift register 311 are transmitted as image signals to the decoder 62. The decoder 62 decodes and decompresses the digital, bandwidthcompressed image signals, so that the television monitor 82 displays the image which has been detected by the camera 16C. The changeover switch 313 receives the signal $C_E$ (as shown in FIG. 11(p)) coupled from the control signal generator 304 and has its movable contact 314 connected with the fixed contact 315. As a result, the pixel signals $(B_1, B_2, \ldots,$ and $B_n)$ coupled from the shift register 312 are stored in the memory 73. The pixel signals stored in the memory 73 are coupled to the decoder 63, and are decoded and decompressed, so that the television monitor 83 displays the image which has been detected the camera 16B. The movable contact with the fixed contact 509, and with the fixed contact 316 when the movable contact of the changeover switch 507 is connected with the fixed contact 510. When the state of the signal $C_E$ changes (the change of state is not shown in FIG. 11(p)), the movable contact 314 of the changeover switch 313 is connected to the fixed contact 316. At that time, the pixel signals $(D_1, D_2, \ldots,$ and $D_n)$ are stored in the shift register 312, so that they are stored in the memory 74 through the changeover switch 313. The pixel signals stored in the memory 74 are coupled to the decoder 64, and are decoded and decompressed. Consequently, the television monitor 84 displays the image which has been detected by the camera 16D. It should be noted that the pixel signals stored in both the memories 73 and 74 are stored therein until the pixel signals of the next frame are coupled thereinto.

As described above, the image signals displayed by the television monitors 81 and 82 are transmitted continuously from the remote site being monitored at all times whereas the image signals displayed by the television monitors 83 and 84 are transmitted alternately for each picture frame, i.e., at a slow speed. As a result, the television monitor 81 and 82 are used for monitoring the sites where conditions being monitored are subject to instantaneous and drastic change. The television monitors 83 and 84 can be utilized for monitoring the sites where conditions are less likely to change. The memories 73 and 74 store image signals for slow-speed images. As a result, even when no image is being transmitted, the television monitors 83 and 84 display the images stored in the memories 73 and 74.

Next, an example of the effects of the present embodiment will be explained with reference to FIG. 12.

First of all, the following conditions are assumed. The transmission line has the capability of a transmission rate of 96 Mbps, and by using the appropriate bandwidth compression method, e.g., a two-dimensional predictive coding scheme, the image signal may be compressed to a digital signal of 4 bits per pixel. In order that such a digital signal may be transmitted at the 4 MHz base frequency, the frequency bandwidth required of the transmission line corresponds to 32 Mbps (4 MHz×2×4 bits). Therefore, a transmission line with a capability of 96 Mbps as mentioned above can be divided into 3 transmission channels, each having a transmission rate of 32 Mbps. Further, assume that one frame of a picture is composed of 512×512 pixels, which corresponds to about 1049K bits of a digital image signal. Where a frame is transmitted through the transmission channel having a transmission rate of 32 Mbps, the time necessary for completing the transmission of one frame is about 33 msec (1049K bits÷32 Mbps). Accordingly, image signals for about 30 frames can be transmitted every second through one transmission channel. If two channels, i.e., a capability of 64 Mbps, are used, image signals for 60 frames can be transmitted every second, and further, those for 90 frames can be transmitted in the case of three channels, i.e., by using the full capability (96 Mbps) of the transmission line. Actually, however, 32 Mbps, i.e., 30 frames per second, is a rate sufficient to reproduce a full motion image at the monitoring site. Namely, the reproduction of the full motion image of a site to be monitored becomes possible, if the image signals of the site can be transmitted at the rate of 30 frames/sec. Therefore, more than one channel need not necessarily be assigned to full motion image transmission for one site being monitored.

In the present embodiment, the two channels of the transmission line which is divided into three transmission channels are assigned to full motion image transmission for two sites which are monitored by the cameras 16A and 16C, and the remaining one transmission channel is used for frame repetition image transmission for two sites which are sensed by the cameras 16B and 16D. Namely, in this case, one channel having the capability of 30 frames/sec is fully occupied for frame repetition image transmission for only two sites to be monitored. Therefore, the capability of the transmission rate of 15 frames/sec is assigned to each site to be monitored. However, the transmission rate of 15 frames/sec/site is extremely high for the frame repetition image transmission and does not result in the effective utilization of the transmission line. According to the inventors' studies and experiences, a transmission rate of 1 frame/sec/site is usually sufficient for frame repetition image transmission, although, of course, it depends on the field in which the image transmission system of this kind is used. If the transmission rate is set at such a value as 1 frame/sec/site, it becomes possible to transmit image signals for 30 sites every second through one transmission channel by assigning each one of 30 frames to each one of 30 sites. Further, if the reduction of the transmission rate, e.g., down to 0.5 frames/sec/site, is allowed, the image signals for 60 sites to be monitored can be transmitted every second through one transmission channel.

Figure 12:
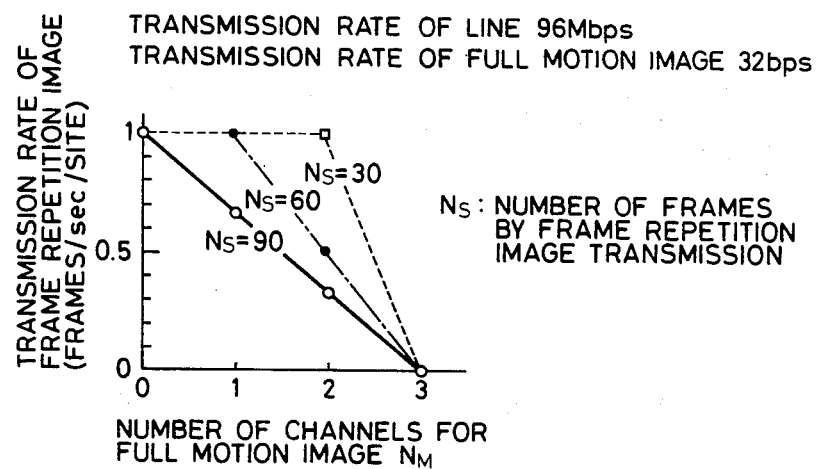
FIG. 12 is a characteristic chart for explaining the effect of the embodiment shown in FIG. 1, in which the relationship between the number of channels for the full motion image and the transmission rate of the frame repetition image is plotted for respective numbers of frames by the frame repetition image transmission.

FIG. 12 is a graph showing the relationship between the transmission rate of the frame repetition image (frames/sec/site) and the number of channels assigned to the full motion image transmission ($M_M$) as mentioned above, for respective numbers of frames by the frame repetition image transmission. As is apparent from the figure, if only one channel is assigned to full motion image transmission and the transmission rate for the frame repetition image is, for example, about 0.7 frames/sec/site, 90 sites can be monitored by the frame repetition image through the remaining two channels.

Here, an example of the actual application of this embodiment, in which there are provided 92 sites to be monitored in a plant or building will be described. Usually, i.e. when there is no malfunction or abnormal state in the plant or building, two channels of the transmission line are assigned to the full motion image transmission for two sites arbitrarily selected among the 92 sites to be nonitored, and the remaining one channel is assigned to the frame repetition image transmission for the remaining 90 sites to be monitored. At this time, as is understood from FIG. 12, the transmission rate of the frame repetition image transmission is about 0.3 frames/sec/site (cf. a point on the $N_S=90$ line with respect to $N_M=2$). If a malfunction or abnormal state among the above mentioned 90 sites has been observed from the display of the frame repetition image, the operator can change the display of the image of the site in question from the frame repetition image to the full motion image by manipulating the push-button switches 2A to 2D (FIG. 1). Namely, if an abnormal condition of the remote site has been observed by camera 16D from the display of the television monitor 84, which is in the frame repetition image state, the operator re-manipulates the push-button switches so that the switch 2D is at first pushed, preceding the manipulation of the other push-button switches. Consequently, the image signal picked up by the camera 16D is transmitted by full motion image transmission. Thus, according to the present embodiment, a system is provided in which the channel or channels can be preferentially assigned to the monitoring operations of the sites having high importance or emergency by means of the full motion images, whereas the remaining channels can be assigned to the monitoring operations of the remaining sites by means of the frame repetition images, so that the limited capacity of the transmission line can be effectively utilized and the system can be suitably applied for monitoring hundred of sites to be monitored as in a large plant or building. With the television monitors which display full motion images, the image transmission period is so short that the monitoring operations can be conducted almost in a real time base. With the television monitors which display frame repetition images, the transmission period for each image is long, but the images of a number of TV cameras can be monitored.

In the present embodiment, the portions of the image signal transmitting unit 50 storing image signals of the frame repetition images have simplified structures because of the limited number of shift registers. In the image signal receiving unit 30, also, the portions (e.g., the shift registers 309 and 312) storing image signals of the frame repetition images have simplified structure. Since the image signals of plural cameras for the frame repetition images are stored alternately in one image storage device, the structures of the storages for the frame repetition images can be simplified so that the structures of the respective units can be simplified.

Figure 13:
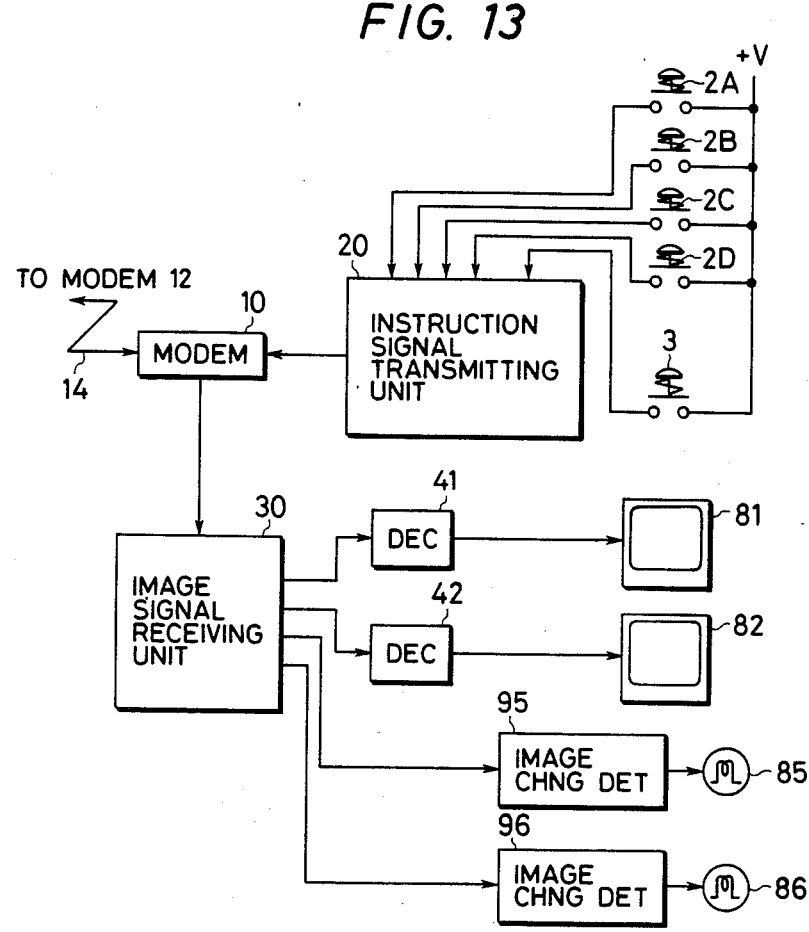
FIG. 13 shows part of a structure of an image transmission system according to another embodiment of the present invention.
Figure 14:
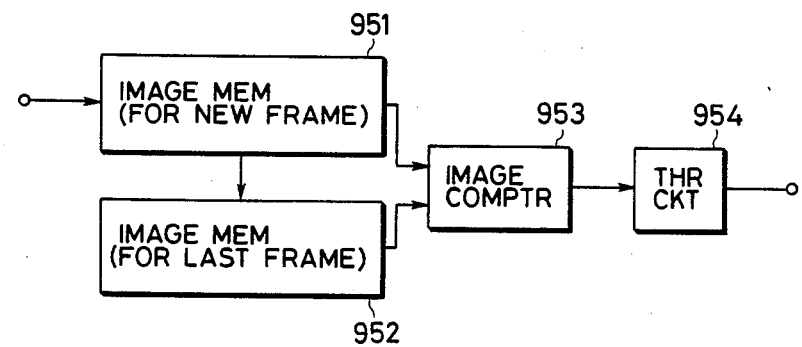
FIG. 14 is a block diagram showing the structure of an image change detection circuit used in the embodiment shown in FIG. 13.

Another embodiment of the present invention is shown in FIG. 13. The same reference characters as those of the embodiment of FIG. 1 indicate the same parts. In this embodiment, reference numerals 95 and 96 indicate image change detection circuits and reference numerals 85 and 86, respectively, alarm lamps. The image change detection circuit 95 or 96 has the structure shown in FIG. 14. A reference numeral 951 indicates an image memory for storing a frame e.g., 512×512 picture elements. A reference numeral 952 designate an image memory for storing the last frame, and a reference numeral 953 designate an image comparator for computing the sum of the difference between the pixel values of the memories 951 and 952. A reference numeral 954 indicates a threshold circuit which generates an output when the sum of the difference of the pixel values of the comparator 953 exceeds a predetermined value, causing the alarm lamp 85 or 86 to light.

Usually, the operator watches the monitor television sets 81 and 82 for full motion images. If the alarm lamp 85 or 86 is energize during detection of image changes by the circuit 95 and 96 for the frame repetition images, the image sensed by the cameras 16A to 16D corresponding to the alarm lamp 85 or 86 can be displayed on the set television monitor 81 or 82, by remanipulating the switches 2A to 2D and 3. Further, by coordinating the operation of the switches 2A to 2D and 3 with the outputs of the image change television circuits 95 and 96, the television monitor 81 or 82 can be automatically switched to display the image detected by the camera 16A to 16D corresponding to the alarm lamp 85 or 86.

Although we have herein shown and described only a limited form of an apparatus embodying the present invention, it is understood that various changes and modifications may be made therein within the scope of the appended claims without departing from the spirit and scope of the present invention.

What is claimed is:

1. An imagery data transmission system for transmitting, over a transmission link, imagery data from a plurality of remote sites, whereat television cameras for monitoring conditions at said sites are located, to a monitoring site for display on a display monitor thereat, the frequency bandwidth of said transmission link being divided into a plurality of transmission channels, comprising:

at said monitoring site, first means, coupled to said transmission link, for transmitting instruction signals for controlling the transmission of imagery data from said remote sites, said instruction signals containing a plurality of codes each of which is selectively assignable to the cameras of said remote sites, said plurality of codes including a first group of codes assigned to respective ones of said cameras for causing imagery data obtained thereby to be transmitted as full motion imagery data and a second group of codes assigned to respective others of said cameras for causing imagery data obtained thereby to be transmitted as frame repetition imagery data; and second means, coupled to said transmission link, for receiving imagery data transmitted from said remote sites and coupling imagery data that has been transmitted as full motion imagery data to respective display monitors for full motion display thereof and for coupling imagery data that has been transmitted as frame repetition imagery data to respective display monitors for displaying thereon frame repetition imagery data; and at each of said remote sites, third means, coupled to said transmission link, for decoding said instruction signals and producing control signals for controlling the transmission of imagery data, derived from cameras thereat, as full motion imagery data or frame repetition imagery data; and fourth means, coupled to said third means and said transmission link, for receiving imagery data generated by said television cameras and transmitting said imagery data over said transmission link as full motion imagery data or frame repetition imagery data in accordance with the control signals produced by said third means, said fourth means including a plurality of first imaging data storage means for storing imagery data derived from respective cameras associated with said first group of codes, and second imagery data storage means for storing, in a timed-shared manner, imagery data derived from respective cameras associated with said second group of codes, and for causing the full motion imagery data stored by said plurality of first imagery data storage means to be transmitted over one of said plurality of transmission channels to said monitoring site and for causing the frame repetition imagery data stored by said second imagery data storage means to be transmitted over the remaining transmission channels in a time division multiplexed format to said monitoring site.

2. An imagery data transmission system according to claim 1, wherein the order of transmission of said first group of codes in said instruction signals preceeds the order of transmission of said second group of codes therein.

3. An imagery data transmission system according to claim 1, wherein said second means includes means for monitoring a prescribed characteristic of the respective frame repetition imagery data and generating an alarm signal in response to said prescribed characteristic exceeding a preestablished threshold value.

4. An imagery data transmission system according to claim 3, wherein the order of transmission of said first group of codes in said instruction signals preceeds the order of transmission of said second group of codes therein.

* * * * *